Figure 1:
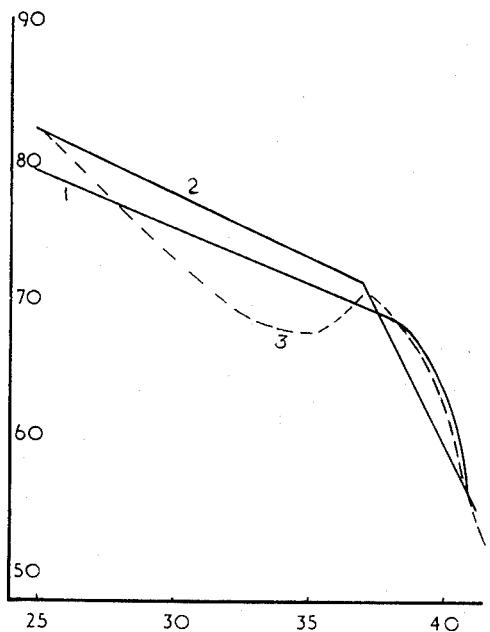

3,198,332
HYDROXY - OXO - ALUMINUM POLYOL COMPOUNDS AND THE PREPARATION THEREOF
Brian K. Davison, Didsbury, Manchester, England, assignor, by mesne assignments, to Agrashell Inc., Los Angeles, Calif., a corporation of Delaware
Filed Apr. 6, 1962, Ser. No. 185,754
Claims priority, application Great Britain, Apr. 18, 1961, 13,974/61
10 Claims. (Cl. 260—209)

This invention relates to organic aluminium compounds and to methods of preparing such compounds, and has for one of its objects to provide compounds suitable for use as antacids. The use of these compounds, however, is not necessarily limited to their use in antacid compositions. The compounds have been found to be useful as starting materials for the production, by calcination, of active aluminas with large specific surface areas and which are useful in the fields of catalysis and adsorbents.

According to the invention, organic aluminium compounds are prepared by reacting together aluminium alcoholates, water and carbohydrate materials.

The term "carbohydrate" is to be understood as including polyols as well as monosaccharides and oligosaccharides. Among the carbohydrate materials to which the process is applicable are xylose, glucose, fructose, mannose, galactose and other monosaccharides, glycerol, sorbitol, mannitol, inositol and other polyols, sucrose, lactose, raffinose and other oligosaccharides. The process is also applicable to mixtures of carbohydrate materials and to such mixtures as invert syrups, fancy molasses, refiners molasses, final molasses and honey.

The aluminium alcoholates which may be used in this process are those which are soluble in organic solvents, and include such alcoholates as those derived from ethyl, isopropyl, n-propyl, n-butyl, s-butyl and t-butyl alcohols. Others which can be used with good result include those derived from amyl and hexyl alcohols.

The compounds which are the subject of this invention consist of aluminium, oxygen, hydroxyl and carbohydrate groups, and are believed to be of (or approximate to) the empirical formula:

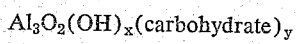

where $x+y=5$ and $y=1$ approaching to 0.

Reaction can be brought about by adding a solution of the carbohydrate in a solvent concurrently with a solution of water in a solvent to the aluminium alcoholate in a solvent. Alternatively, the water and the carbohydrate can be dissolved together in a common solvent and this solution added to the aluminium alcoholate in a solvent. Alternatively, the whole of the carbohydrate in a solvent may be added to the aluminium alcoholate and then followed by the water, preferably in a solvent. Also reaction can be brought about by first causing the aluminium alcoholate to react with up to two moles of water per 3 moles of aluminium alcoholate and then adding the solution of the carbohydrate in a solvent either simultaneously with the remaining water preferably in a solvent, or the remaining water may be dissolved together with the carbohydrate and this solution added. If first, all the water is added to the aluminium alcoholate, and then the carbohydrate material is added, some reaction between the product which precipitated out after the addition of the water and the carbohydrate material does occur if the reaction mixture is given a prolonged maturing time. However the products obtained by this route, although possessing adequate neutralising capacity when this is determined by the method given in the British Pharmacopoeia (1958), are inferior to the products of the invention when tested for speed of neutralisation, buffering capacity and antacid activity in an artificial gastric medium.

In those compounds where $y$ approaches 1, the carbohydrate is not wholly soluble in the solvent in the quantity required, and it has been found that the carbohydrate material may be added as a slurry without any lose of yield or activity by the product. The preferred process is to dissolve the carbohydrate and the water together in a solvent and add this solution to the solution of the aluminium alcoholate in a solvent.

In carrying out this reaction the amount of water added is critical. It is known that if water is added to an aluminium alcoholate the alcohol forming the alcoholate is liberated and a hydroxyl compound is formed. For instance, if three moles or more of water are added to one mole of aluminium isopropoxide, one mole of aluminium hydroxide is formed and three moles of isopropanol are liberated:

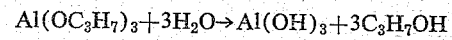

It is also known that if one mole of water is added to an aluminium alcoholate it is possible, under suitable conditions, to liberate two moles of the alcohol forming the oxo-alkoxide:

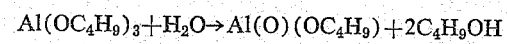

However, to form compounds of the empirical formula $Al_3O_2(OH)_x(carbohydrate)_y$ it is essential that only $2+x$ moles of water are added per three moles of aluminium alcoholate, and that $x+y$ equals 5 moles. For this purpose the formula weight of the carbohydrate is taken as the gram molecular weight. When using carbohydrate materials such as invert syrups, fancy molasses, refiners molasses, final molasses and honey, allowance has to be made for the water content of these materials, and the additional water adjusted accordingly to maintain the total water added at $2+x$ moles per three moles of aluminium alkoxide.

It should be noted that the quantity of water added is correct only insofar as the exact stoichiometric proportions pertain. Practical considerations, such as, for example, retention of some of the water by the solvent will necessitate a divergence from this quantity. Also it should be noted that when the products of the invention are produced on a small scale they are adequately represented by the empirical formula $Al_3O_2(OH)_x$ (carbohydrate)$_y$, but when they are produced upon a larger than laboratory scale the products can contain up to 5% by weight of the original alkoxide alcohol.

By varying the values of $x$ and $y$, products of different antacid capacity and buffering capacity are obtained from the same carbohydrate. In general, the higher the aluminium percentage in the compound, this means the larger the value of $x$, the greater is the acid binding capacity because this is measured per unit of weight. However, comparing chemical equivalent weights the higher the value of $y$ the greater is the acid binding efficiency per unit of aluminium. Also the greater the value of $y$ the greater is the speed of neutralisation. When $y$ approaches 0, that is $x$ approaches 5, products of low acid binding efficiency per unit of aluminium, low buffering capacity and only moderate antacid capacity are obtained. The effect of varying the concentration of the carbohydrate present in the product upon the buffering the neutralising capacity as determined by the method in the British Pharmacopoeia 1958 for dried aluminium hydroxide gel is illustrated in the Table I below:

TABLE I

| Type of $Al_3O_2(OH)_x$-(carbohydrate)$_y$ | pH after | | | ml. 0.1N NaOH | Neutralising capacity, ml. 0.1N HCl/gm. |
|---|---|---|---|---|---|
| | 10 mins. | 15 mins. | 20 mins. | | |
| Sucrose | | | | | |
| x | y | | | | |
| 4 | 1 | 1.85 | 1.86 | 1.87 | 71.3 | 157.4 |
| 4½ | ½ | 3.03 | 3.22 | 3.30 | 46.0 | 208.0 |
| 4¾ | ¼ | 3.42 | 3.50 | 3.53 | 28.0 | 244.0 |
| 4⅞ | ⅛ | 3.60 | 3.70 | 3.70 | 10.0 | 280.0 |
| 4 15/16 | 1/16 | 3.35 | 3.55 | 3.60 | 14.7 | 270.6 |
| 4 31/32 | 1/32 | 3.61 | 3.65 | 3.68 | 2.1 | 395.8 |
| Glucose | | | | | |
| x | y | | | | |
| 4 | 1 | 3.3 | 3.4 | 3.4 | 42.2 | 215.6 |
| 4½ | ½ | 3.5 | 3.6 | 3.6 | 22.6 | 254.8 |
| 4¾ | ¼ | 3.4 | 3.6 | 3.65 | 13.2 | 273.6 |
| 4⅞ | ⅛ | 3.6 | 3.6 | 3.68 | 3.5 | 293.0 |
| Sorbitol | | | | | |
| x | y | | | | |
| 4 | 1 | 2.6 | 3.2 | 3.5 | 38.9 | 222 |
| 4½ | ½ | 2.7 | 3.5 | 3.65 | 30 | 240 |
| 4¾ | ¼ | 3.3 | 3.55 | 3.7 | 22.3 | 255.4 |
| 4⅞ | ⅛ | 3.6 | 3.7 | 3.72 | 5.2 | 289.6 |
| Nil x=5, y=0 | | 1.9 | 2.4 | 3.5 | 24.2 | 251 |
| Dried aluminium hydroxide Gel BP | | 1.8 | 2.5 | 3.3 | 20.1 | 260 |

The effect of variation in the concentration of the carbohydrate present in the product upon the speed of neutralisation of 0.1 N hydrochloric acid is illustrated in Table II, which gives the pH values recorded after specific time intervals during the neutralisation of 50 mls. of 0.1 N hydrochloric acid by 0.5 gm. of the product.

TABLE II

| Type of $Al_3O_2(OH)_x$ (carbohydrate)$_y$ | pH after time in seconds | | | | | | | |
|---|---|---|---|---|---|---|---|---|
| | 0 | 5 | 10 | 15 | 20 | 30 | 40 | 50 |
| Sucrose | | | | | | | | |
| x | y | | | | | | | |
| 4 | 1 | 0.96 | 1.4 | 1.5 | 1.75 | 2.15 | 3.0 | 3.2 | 3.3 |
| 4½ | ½ | 0.85 | 0.95 | 1.15 | 1.4 | 2.15 | 3.01 | 3.15 | 3.2 |
| 4¾ | ¼ | 1.1 | 1.2 | 1.5 | 1.6 | 1.9 | 3.4 | 3.6 | 3.7 |
| 4⅞ | ⅛ | 0.94 | 0.97 | 1.03 | 1.06 | 1.11 | 1.11 | 1.15 |
| 4 15/16 | 1/16 | 0.86 | 0.88 | 0.89 | 0.9 | 0.91 | 0.92 | 0.96 | 0.97 |
| 4 31/32 | 1/32 | 0.72 | 0.75 | 0.79 | 0.8 | 0.81 | 0.83 | 0.85 | 0.86 |
| Nil x=5 y=0 | 0.82 | 0.86 | 0.9 | 0.92 | 0.93 | 0.95 | 1.0 | 1.0 |
| Dried Aluminium Hydroxide Gel BP | 1.0 | 1.0 | 1.01 | 1.02 | 1.02 | 1.04 | 1.05 | 1.07 |

| Type of $Al_3O_2(OH)_x$ (carbohydrate)$_y$ | pH after time in seconds | | | | |
|---|---|---|---|---|---|
| | 60 | 90 | 120 | 180 | 600 |
| x | y | | | | | |
| 4 | 1 | 3.35 | 3.4 | 3.4 | 3.5 | 3.56 |
| 4½ | ½ | 3.27 | 3.33 | 3.35 | 3.4 | 3.45 |
| 4¾ | ¼ | 3.7 | 3.72 | 3.75 | 3.75 | 3.75 |
| 4⅞ | ⅛ | 1.2 | 1.36 | 1.55 | 2.75 | 3.57 |
| 4 15/16 | 1/16 | 1.0 | 1.11 | 1.29 | 1.75 | 3.4 |
| 4 31/32 | 1/32 | 0.9 | 0.98 | 1.0 | 1.15 | 3.31 |
| Nil x=5, y=0 | 1.01 | 1.02 | 1.07 | 1.1 | 1.72 |
| Dried Aluminium Hydroxide Gel BP | 1.08 | 1.15 | 1.24 | 1.51 | 35.2 |

Figure 2:
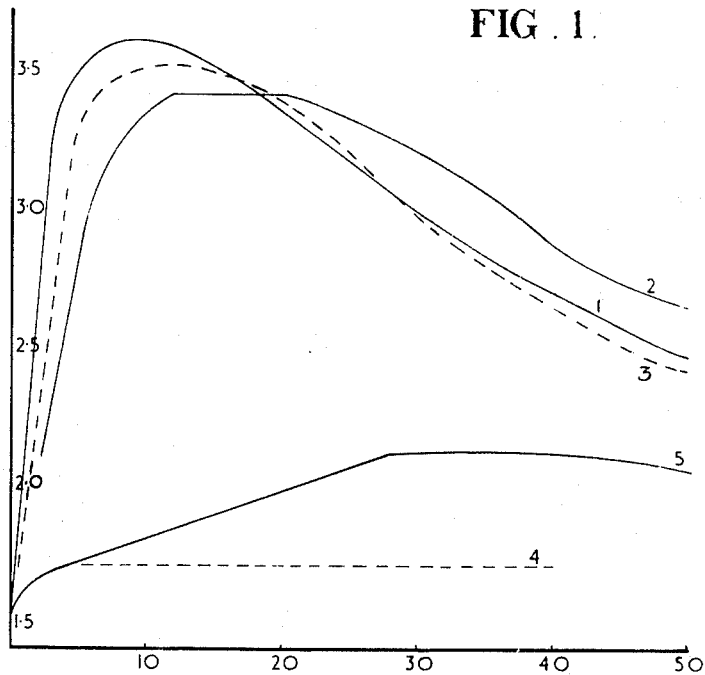

Referring to the accompanying drawings,
FIGURE 1 shows curves illustrating the effect of variation of the percentage of aluminium in the product on the acid binding efficiency.
FIGURE 2 shows curves illustrating the effect of the products on the acidity of an artificial gastric juice.
In FIGURE 1, the ordinates represent the acid binding efficiency, while the abscissae represent the percentage aluminium content, which increases as the carbohydrate content decreases. Three curves are shown using different carbohydrates, namely sucrose for curve 1, glucose for curve 2 and sorbitol for curve 3. It will be seen that in all cases, the smaller aluminium contents, i.e. the larger values of $y$, lead to higher acid binding efficiencies.

To illustrate the behaviour of the products under conditions more closely resembling "in vivo" conditions, some of the results obtained when the products were tested in an artificial gastric medium are given. The medium used was that of Brindle (1953) and consisted of 0.05 N hydrochloric acid buffered with 0.15 percent of pepsin, 0.15 percent of peptone and 0.15 percent of sodium chloride. The test method required the measurement, at regular intervals, of the pH of the artificial gastric juice at 37° C. from the time of adding the product (0.5 gm.) until all the product had been consumed. Initially 150 ml. of artificial gastric juice are used, this has a pH of 1.45, 2 ml. of fresh juice are added every minute and after each 10 minute interval 20 ml. of the total artificial mixture are withdrawn and rejected. FIGURE 2 shows the pH measurements plotted as ordinates against time, for Curve
$Al_3O_2(OH)_{4\,3/4}$ (sucrose)$_{1/4}$ ------------------------ 1
$Al_3O_2(OH)_{4\,1/2}$ (glucose)$_{1/2}$ ------------------------ 2
$Al_3O_2(OH)_{4\,1/2}$ (sorbitol)$_{1/2}$ ------------------------ 3
$Al_3O_2(OH)_5$ ------------------------------------------ 4
Dried aluminium hydroxide gel B.P. ----------------- 5

To illustrate the suitability of the products of the invention for use in the fields of catalysis and adsorbents, the following results from calcining were obtained:

The compounds $Al_3O_2(OH)_{4\,7/8}$(sucrose)$_{1/8}$, $Al_3O_2(OH)_{4\,31/32}$ (sucrose)$_{1/32}$ and $Al_3O_2(OH)_5$ after calcining in an air oven at 550° C. for 2 hours give aluminas of specific surface areas 466 m.²/gm., 447 m.²/gm. and 462 m.²/gm. and micro-pore volumes 0.92 ml./gm., 0.85 ml./gm. respectively when these are determined by low temperature gas adsorption at 77.4° K. using nitrogen as the adsorbate.

The invention is illustrated by the following examples.

*Example 1*

A hydroxy oxo aluminium glycerate which approximates to the formula:

$$Al_3O_2(OH)_4 \text{ (glycerol)}$$

Aluminium isopropoxide (207.3 gms.) was dissolved in isopropanol (530 mls.) and heated to reflux temperature, efficient agitation being maintained throughout the reaction. On the solution reaching boiling point, the external heating supply was disconnected and a solution of glycerol (31.18 g.) and water (36.6 g.) in isopropanol (250 mls.) added carefully from a dropping funnel. The product which precipitates out was matured for half-an-hour and then allowed to cool prior to filtration. The product was dried in an oven at 50° C. to constant weight to give 306 gms.

Antacid capacity, determined by the method given in the British Pharmacopoeia (1958), is 255 mls. of N/10 hydrochloric acid per gram.

*Example 2*

A hydroxy oxo aluminium sucrate which approximates to the formula:

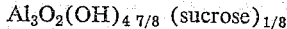
$$Al_3O_2(OH)_{4\ 7/8}\ (sucrose)_{1/8}$$

Aluminium isopropoxide (102 gms.) was dissolved in isopropanol (250 mls.) and the whole heated with stirring under reflux in an oil-bath. Sucrose (7.1 gms.) and water 20.6 gms. mixed together in isopropanol (150 mls.) were then added dropwise over about 30 minutes. The reaction mixture was heated for a further 30 minutes. After cooling a little the product was filtered off and dried at 50° C. to constant weight to give 44 gms. yield.

*Example 3*

A hydroxy oxo aluminium glucose which approximates to the formula:

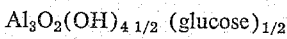
$$Al_3O_2(OH)_{4\ 1/2}\ (glucose)_{1/2}$$

Aluminium isopropoxide (102 gms.) was dissolved in isopropanol (250 mls.) and heated to reflux temperature, and agitation maintained throughout the reaction. On the solution reaching boiling point, glucose (15 gms.) and water (19.5 gms.) mixed together in isopropanol (150 mls.) were added dropwise over 30 minutes. The product which precipitates out was then matured for a further 30 minutes and allowed to cool a little before being filtered. The product was dried to constant weight at 50° C. in an oven and weighed (52 gms.).

*Example 4*

A hydroxy oxo aluminium lactose which approximates to the formula:

$$Al_3O_2(OH)_{4\ 7/8}\ (lactose)_{1/8}$$

Aluminium s-butoxide (123 gms.) was dissolved in s-butanol (400 mls.) and heated to reflux temperature and agitation maintained throughout the reaction. Upon the solution reaching boiling point, lactose (7.5 gms.) dissolved in water (20.6 gms.) was added dropwise over 30 minutes. The product which precipitates out was then matured for a further 30 minutes and allowed to cool a little before being filtered. The product was dried to constant weight at 50° C. and weighed 45.5 gms.

The antacid capacity, determined by the method given in the British Pharmacopoeia (1958) is 280.4 mls. of N/10 hydrochloric acid per gram.

*Example 5*

A hydroxy oxo aluminium sucrose which approximates to the formula:

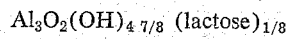
$$Al_3O_2(OH)_{4\ 31/32}\ (sucrose)_{1/32}$$

Aluminium isopropoxide (102 gms.) was dissolved in isopropanol (200 mls.) and heated to reflux temperature, efficient agitation being maintained throughout the reaction. Upon the solution reaching boiling point, sucrose (1.77 gms.) slurried in isopropanol (100 mls.) was added. Then water (20.95 gms.) in isopropanol (100 mls.) was added dropwise over 30 minutes and after a further 30 minutes at 80° C. the product was filtered off and dried to contant weight at 50° C. to give 36 gms.

*Example 6*

A hydroxy oxo aluminium sucrose glucose which approximates to the formula:

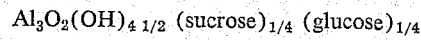
$$Al_3O_2(OH)_{4\ 1/2}\ (sucrose)_{1/4}\ (glucose)_{1/4}$$

Aluminium isopropoxide (102 gms.) was dissolved in isopropanol (400 mls.) and heated to reflux temperature, efficient agitation being maintained throughout the reaction. Upon the solution reaching boiling point, a solution of sucrose (14.2 gms.) and glucose (7.5 gms.) in water (19.5 gms.) was added dropwise over 30 minutes. The reaction mixture was allowed to cool and product filtered off and dried at 50° C. to give 54 gms.

The antacid capacity, determined by the method given in the British Pharmacopoeia (1958), is 265 mls. N/10 hydrochloric acid per gram.

*Example 7*

A hydroxy oxo aluminium carbohydrate which approximates to the formula:

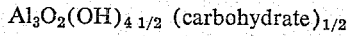
$$Al_3O_2(OH)_{4\ 1/2}\ (carbohydrate)_{1/2}$$

Lyles "Golden Syrup" was analysed and found to contain 48.5% glucose, 31.0% sucrose, 17.2% water and 3.3% mineral and organic matter. The syrup contains for our purpose 0.3605 mole of carbohydrate per 100 grams.

Aluminium isopropoxide (102 gms.) was dissolved in isopropanol (400 mls.) and heated to reflux temperature, efficient agitation being maintained throughout the reaction. Upon the solution reaching boiling point, a solution of Lyles "Golden Syrup" (23.1 gms.) in water (15.5 gms.) was added over 30 minutes. The reaction mixture was matured at 80° C. for 30 minutes and then allowed to cool before filtering off the product. The product was filtered off and dried at 50° C. to give 55.5 gms.

The antacid capacity, determined by the method given in the British Pharmacopoeia (1958), is 253.8 mls. N/10 hydrochloric acid per gram.

*Example 8*

A hydroxy oxo aluminium glucose which approximates to the formula:

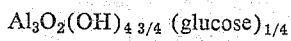
$$Al_3O_2(OH)_{4\ 3/4}\ (glucose)_{1/4}$$

Aluminium isopropoxide (102 gms.) was dissolved in isopropanol (200 mls.) and heated to reflux temperature, efficient agitation being maintained throughout the reaction. Upon the solution reaching boiling point a solution of water (5.98 gms.) in isopropanol (50 mls.) was added slowly. Then a solution of glucose (7.5 gms.), water (14.22 gms.) and isopropanol (150 mls.) was added over 30 minutes. The reaction mixture was matured for 30 minutes, the precipitated product filtered off and dried to constant weight at 50° C. to give 47.5 gms.

The antacid capacity, determined by the method given in the British Pharmacopoeia (1958), is 275 mls. N/10 hydrochloric acid per gram.

*Example 9*

A hydroxy oxo aluminium carbohydrate which approximates to the formula:

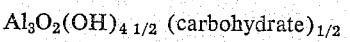
$$Al_3O_2(OH)_{4\ 1/2}\ (carbohydrate)_{1/2}$$

A sample of honey was analysed and found to contain reducing sugars 70.9%, sucrose 2.4%, water 22.8% and 3.9% of mineral and organic matter.

Aluminium isopropoxide (102 gms.) was dissolved in isopropanol (400 mls.) and heated to reflux temperature, efficient agitation being maintained throughout the reaction. Upon the solution reaching boiling point a solution of honey (40.9 gms.) and water (10.2 gms.) was added over 30 minutes. The reaction mixture was then refluxed for a further 30 minutes and allowed to cool. The product was then filtered off and dried at 50° C. to constant weight to give 62 gms.

The antacid capacity, determined by the method given in the British Pharmacopoeia (1958), is 218 mls. N/10 hydrochloric acid per gram.

*Example 10*

A hydroxy oxo aluminium glucose which approximates to the formula:

$$Al_3O_2(OH)_{4\ 3/4}(glucose)_{1/4}$$

Aluminium isopropoxide (102 gms.) was dissolved in isopropanol (200 mls.) and heated to reflux temperature and agitation maintained throughout the reaction. Upon the solution reaching boiling point a solution of water (20.2 mls.) in isopropanol (100 mls.) and a slurry of glucose (7.5 gms.) in isopropanol (100 mls.) were added simultaneously over 30 minutes. The product which precipitates out was then matured for a further 30 minutes and then filtered. The product was dried to constant weight at 50° C. in an oven and weighed 46 gms.

The antacid capacity, determined by the method of the British Pharmacopoeia (1958), is 273 mls. N/10 hydrochloric acid per gram.

*Example 11*

A hydroxy oxo aluminium xylose which approximates to the formula:

$$Al_3O_2(OH)_{4\ 7/8}(xyloso)_{1/8}$$

Aluminium n-amyl alkoxide (108 gms.) was dissolved in n-amyl alcohol (200 mls.) and heated to reflux temperature and agitation maintained throughout the reaction. The reaction solution was then allowed to cool to 90–95° C. and xylose (2.34 gms.) in water (15.5 mls.) was added dropwise. The reaction solution was then heated under reflux for 20 minutes and allowed to cool to 60–50° C. before being filtered off. The product was dried to constant weight at 100° C. in a vacuum oven and weighed 29 gms.

The antacid capacity, determined by the method of the British Pharmacopoeia (1958), is 240 mls. N/10 hydrochloric acid per gram.

*Example 12*

A hydroxy oxo aluminium vitamin C which approximates to the formula:

$$Al_3O_2(OH)_{4\ 3/4}(vitamin\ C)_{1/4}$$

Aluminium isopropoxide (102 gms.) was dissolved in isopropyl alcohol (250 mls.) and heated to reflux temperature and efficient agitation maintained throughout the reaction. Upon the solution reaching boiling point a slurry of vitamin C (l-xylo-ascorbic acid) (7.3 gms.) and water 20.3 gms. in isopropanol (100 mls.) was added over 30 minutes. The product was then matured for 30 minutes and filtered. The product was dried to constant weight at 50° C. and weighed 41 gms.

The antacid capacity, determined by the method of the British Pharmacopoeia (1958), is 289 mls. N/10 hydrochloric acid per gram.

What is claimed is:

1. A process for preparing organic aluminum compounds of the formula $$Al_3O_2(OH)_x(polyol)_y$$

where $x+y=5$, $y$ is greater than zero, and $x$ is no less than 4, which process comprises adding water and a polyol having at least 3 carbon atoms, having hydroxyl groups on adjacent carbon atoms, and consisting of carbon, hydrogen, and oxygen to a solution of an aluminum alcoholate of a lower aliphatic alcohol in an inert organic solvent, said addition taking place at the reflux temperature of the solution, and said aluminum alcoholate and water being reacted in a proportion of 3 molar parts to $2+x$ molar parts respectively.

2. A process as in claim 1 wherein said water and polyol are each added in solution in an organic solvent inert to the reaction.

3. A process as in claim 1 wherein said polyol and aluminum alcoholate are first combined, and then the combination is reacted with said water.

4. A process as in claim 1 wherein up to 2 molar parts of said water are first combined with each 3 molar parts of said aluminum alcoholate, and then the combination is reacted with said polyol and the remainder of said water.

5. A process as in claim 1 wherein said polyol is a saccharide.

6. An organic aluminum compound of the formula $$Al_3O_2(OH)_x(polyol)_y$$

where $x+y=5$, $y$ is greater than zero, and $x$ is no less than 4, said polyol having at least 3 carbon atoms, having hydroxyl groups on adjacent carbon atoms, and consisting of carbon, hydrogen, and oxygen.

7. A compound as in claim 6 wherein said polyol is a saccharide.

8. A compound as in claim 6 wherein said polyol is a monosaccharide.

9. A compound as in claim 6 wherein said polyol is a disaccharide.

10. A compound as in claim 6 wherein said polyol is a pentose.

References Cited by the Examiner

UNITED STATES PATENTS

| 530,202 | 12/94 | Pickles | 260—209 |
|---|---|---|---|
| 2,913,468 | 11/59 | Rinse | 260—448 |
| 2,917,366 | 12/59 | Hansford | 260—448 |
| 2,932,659 | 4/60 | Orthner et al. | 260—448 |

FOREIGN PATENTS

| 772,144 | 4/57 | Great Britain. |
|---|---|---|

OTHER REFERENCES

Bailar: Chemistry of the Coordination Compounds, pp. 23 and 24 (1956).

CHARLES B. PARKER, *Primary Examiner.*